US009004598B2

(12) United States Patent
Weber et al.

(10) Patent No.: US 9,004,598 B2
(45) Date of Patent: Apr. 14, 2015

(54) SEATING SYSTEM FOR A RECUMBENT STEPPER

(71) Applicant: NuStep, Inc., Ann Arbor, MI (US)

(72) Inventors: Matthew Paul Weber, Brighton, MI (US); Douglas Robert Hennigar, Ann Arbor, MI (US); Roger Adrian Fettes, Ann Arbor, MI (US); Karl G. Sponsler, Canton, MI (US)

(73) Assignee: NuStep, Inc., Ann Arbor, MI (US)

( * ) Notice: Subject to any disclaimer, the term of this patent is extended or adjusted under 35 U.S.C. 154(b) by 212 days.

(21) Appl. No.: 13/736,554

(22) Filed: Jan. 8, 2013

(65) Prior Publication Data
US 2014/0191552 A1 Jul. 10, 2014

(51) Int. Cl.
*A47C 1/023* (2006.01)
*A63B 22/00* (2006.01)
*B60N 2/08* (2006.01)
*B60N 2/07* (2006.01)

(52) U.S. Cl.
CPC .......... *A63B 22/0046* (2013.01); *B60N 2/0818* (2013.01); *A47C 1/023* (2013.01); *B60N 2/0715* (2013.01)

(58) Field of Classification Search
CPC .. A63B 22/0046; A47C 1/023; B60N 2/0818; B60N 2/0715
USPC ........................................................ 297/344.1
See application file for complete search history.

(56) References Cited

U.S. PATENT DOCUMENTS

| 3,542,326 | A | * | 11/1970 | Reapsummer | 297/344.1 |
| 3,622,202 | A | * | 11/1971 | Brown | 297/344.1 X |
| 5,584,460 | A | * | 12/1996 | Ropp | 297/344.1 |
| 5,884,887 | A | * | 3/1999 | Garelick et al. | 297/344.1 |
| 7,866,751 | B2 | * | 1/2011 | Downey | 297/344.1 |
| 8,548,687 | B2 | * | 10/2013 | Jefferies et al. | 701/45 X |
| 2010/0253123 | A1 | * | 10/2010 | DeCraene et al. | 297/344.1 |

* cited by examiner

*Primary Examiner* — Anthony D Barfield
(74) *Attorney, Agent, or Firm* — Brinks Gilson & Lione

(57) ABSTRACT

An adjustable seating apparatus for a recumbent stepper includes a seat base mounted to a carriage, which is mounted for longitudinal translation along a guide track. The seat base can be rotatable relative to the carriage. The seat base includes a first handle for releasing the carriage from an elongate positioning member to adjust the longitudinal position, and a second handle for releasing the seat base from a positioning plate to adjust the rotary position of the seat base relative to the carriage. When the seat base has been rotated from its nominal position, the carriage will generally be prevented from being released from the elongate positioning member.

16 Claims, 14 Drawing Sheets

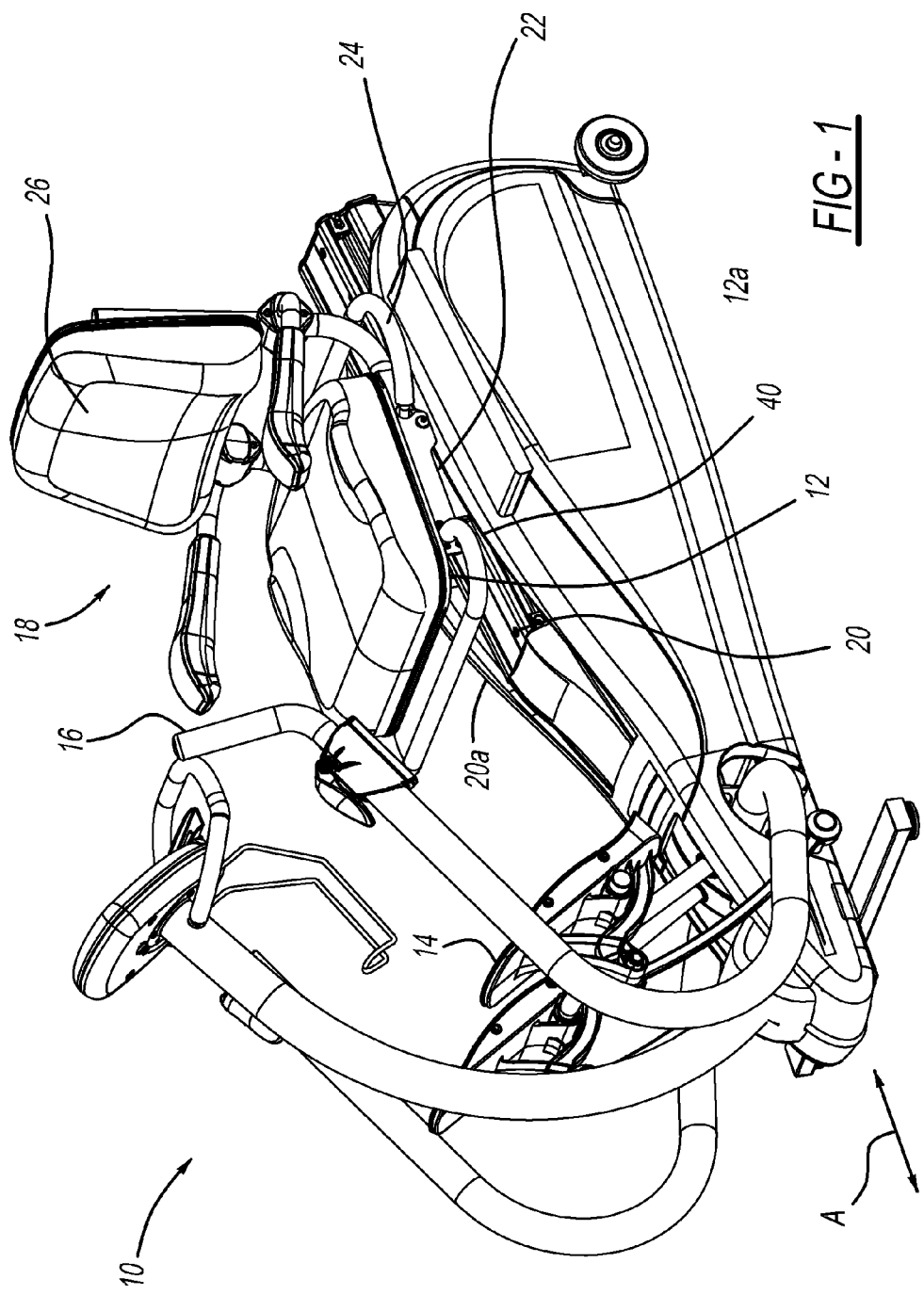

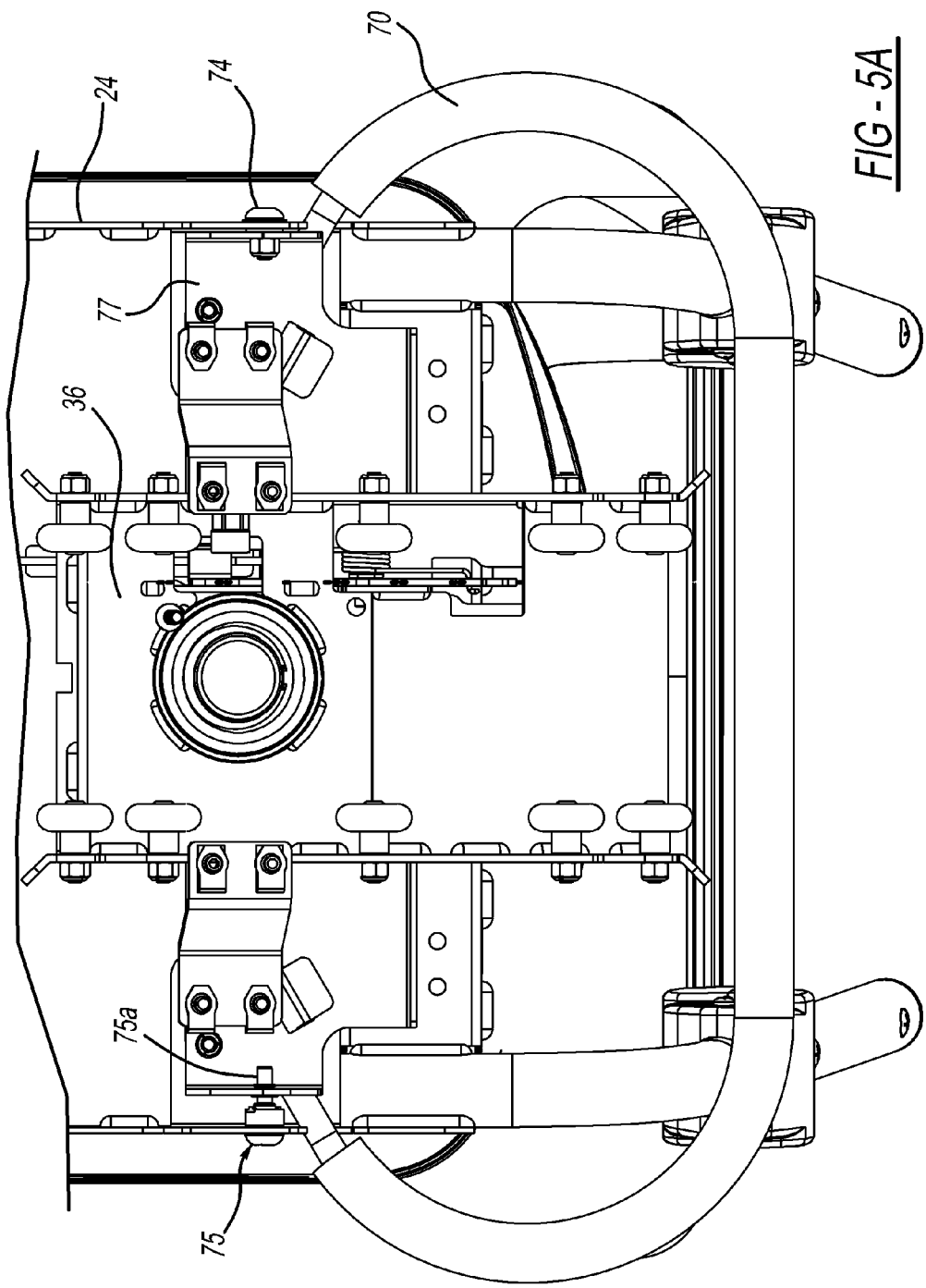

SEATING SYSTEM FOR A RECUMBENT STEPPER

BACKGROUND

1. Field of the Invention

The present invention generally relates to exercise machines. More particularly, the present invention relates to a seating system for a recumbent stepper machine.

2. Description of Related Art

Exercise machines such as recumbent stepper machines include pedals operatively connected to levers or handles for providing cardiovascular exercise to users. A stepper machine includes a seat for allowing the user to remain seated during the exercise routine, in contrast to similar pedal and lever machines such as elliptical exercise machines.

Because the user of the stepper machine is seated, a seating mechanism is provided that can be adjusted to account for the differing heights of various users, unlike other machines, such as elliptical machines, where the user remains in a generally upright and standing position. Because the user is seated, the seat may need to be adjusted so that the user's feet can reach the pedals. In an elliptical machine, because the user is standing, such adjustment are unnecessary because the user is standing and inherently in contact with the pedals.

Stepper machines are often preferred by users that may have difficulty exercising in an upright position, due to a variety of reasons, including injury and disability, but are still capable of exercising in a seated position. The same reasons can make it difficult for some users to sit down onto the seat.

SUMMARY

The present invention relates to the construction of an adjustable seating apparatus.

An adjustable seating apparatus is provided comprising: a guide track having a longitudinal fore-and-aft centerline; an elongate positioning member mounted to the guide track generally parallel to the fore-and-aft centerline; a carriage member mounted to the guide track via a tracked connection for longitudinal adjustment relative to the guide track; a seat base mounted to the carriage member via a rotatable connection for rotary adjustment of the seat base relative to the carriage member; wherein the seat base has at least a first longitudinal locked position, a longitudinal intermediate position, a second longitudinal locked position, a first rotary locked position, a rotary intermediate position, and a second rotary locked position; a first handle mounted to the seat base via a first pivotable connection; a release activator mounted to the first handle portion; a locking lever pivotally mounted to the carriage via a pivotable connection, the locking lever having a first locking tab at an end thereof; a plurality of recesses in the positioning member aligned longitudinally therealong; wherein the first handle and release activator are biased toward a non-activated position; wherein the locking lever is biased toward a first locked position with the locking tab portion received in one of the plurality of recesses in the positioning member when the seat base is in the first longitudinal locked position or the second longitudinal locked position.

In another form, the apparatus further comprises a second handle mounted to the seat base via a second pivotable connection; a second locking tab fixedly mounted to the second handle; a positioning plate mounted to the carriage member; a plurality of recesses aligned circumferentially about the positioning plate; wherein the second handle and the second locking tab are biased toward a second non-activated position with the second locking tab received in one of the plurality of recesses when the seat base is in the first rotary locked position or the second rotary locked position.

In another form, the locking lever includes an activator surface at one end and the first locking tab at another end, with the locking lever pivotable connection therebetween.

In another form, the release activator engages and depresses the activator surface of the locking lever so that the first locking tab is disengaged from the elongate positioning member recesses when the first handle and release activator are in an activated position and the seat base is in the first rotary locked position, thereby allowing for longitudinal translation of the seat base from the first or second longitudinal locked position.

In another form, the locking tab portion of the locking lever engages the positioning member when the release activator is disengaged from the locking lever.

In another form, the second locking tab is received within the positioning plate recess when the second handle is in a non-activated position for preventing rotation of the seat member, and the locking tab portion is disengaged from the plate recess when the second handle is in an activated position for allowing rotation of the seat base.

In another form, the release activator is rotated away and disengaged from the activator surface of the locking lever when the seat base is in the intermediate rotary position or the second rotary locked position, and the locking lever tab potion engages one of the positioning member recesses due to the disengagement of the locking lever and release activator so that the seat base is limited from translating longitudinally when the seat base is in the intermediate rotary position or the second rotary locked position.

In another form, the release activator is fixedly mounted to the first handle at one end and a hammer portion extends downwardly from the other end.

In another form, the apparatus further comprises a plate member extending between opposite ends of the second handle, and the second locking tab extends downwardly from the plate member within a perimeter of the second handle.

In another form, the apparatus comprises a master pivotable connection between the second handle and the seat base at one end of the second handle and a slave pivotable connection between the second handle and the seat base at the other end of the second handle, wherein the master pivotable connection is configured to allow a rotational degree of travel of the second handle and limiting lateral looseness between second handle and the seat base, and the slave pivotable connection is configured to allow for limited lateral translation between the second handle and the seat base along with a rotational degree of travel.

In another form, the apparatus further comprises a seat back mounted to the seat base; and an arm rest rotatably mounted to the seat back via a rotatable connection.

In another form, the rotatable connection comprises: a bushing mounted to the seat back, the bushing having inner and outer chambers therein generally separated by flange portion therebetween; a shaft portion mounted to the armrest and extending at least partially through the bushing, the shaft portion having an inner portion and an outer portion, wherein the inner portion has a smaller diameter than the outer portion, and the inner portion extends through a hole in the flange portion so that the inner portion is received in the outer chamber; and a coil spring mounted to an inner end of the inner portion and disposed within the inner chamber and between the inner end and the flange portion so that the coil spring biases the shaft portion inwardly.

In another form, the apparatus further comprises at least one post mounted to the seat back and extending generally parallel to the bushing; a stop member mounted to the armrest and having at least one concave surface, wherein the at least one concave surface is configured to abut the at least one post member when the armrest has been rotated to a first armrest position.

In another form, the seat back includes a support bar mounted to the seat base, and the rotatable connection is mounted to the support bar.

In another form, the guide track is a c-shaped guide track defining a cavity.

In another form, the apparatus further comprises a seat position magnet disposed within the cavity and a seat position sensor extending along the guide track.

In another form, the seat base is rotatable 360 degrees relative to the carriage.

BRIEF DESCRIPTION OF THE DRAWINGS

FIG. 1 is an isometric view showing a recumbent stepper having an adjustable seating apparatus mounted thereto;

FIG. 5A is a bottom view of the second handle and the plate member;

DETAILED DESCRIPTION

Figure 1A:
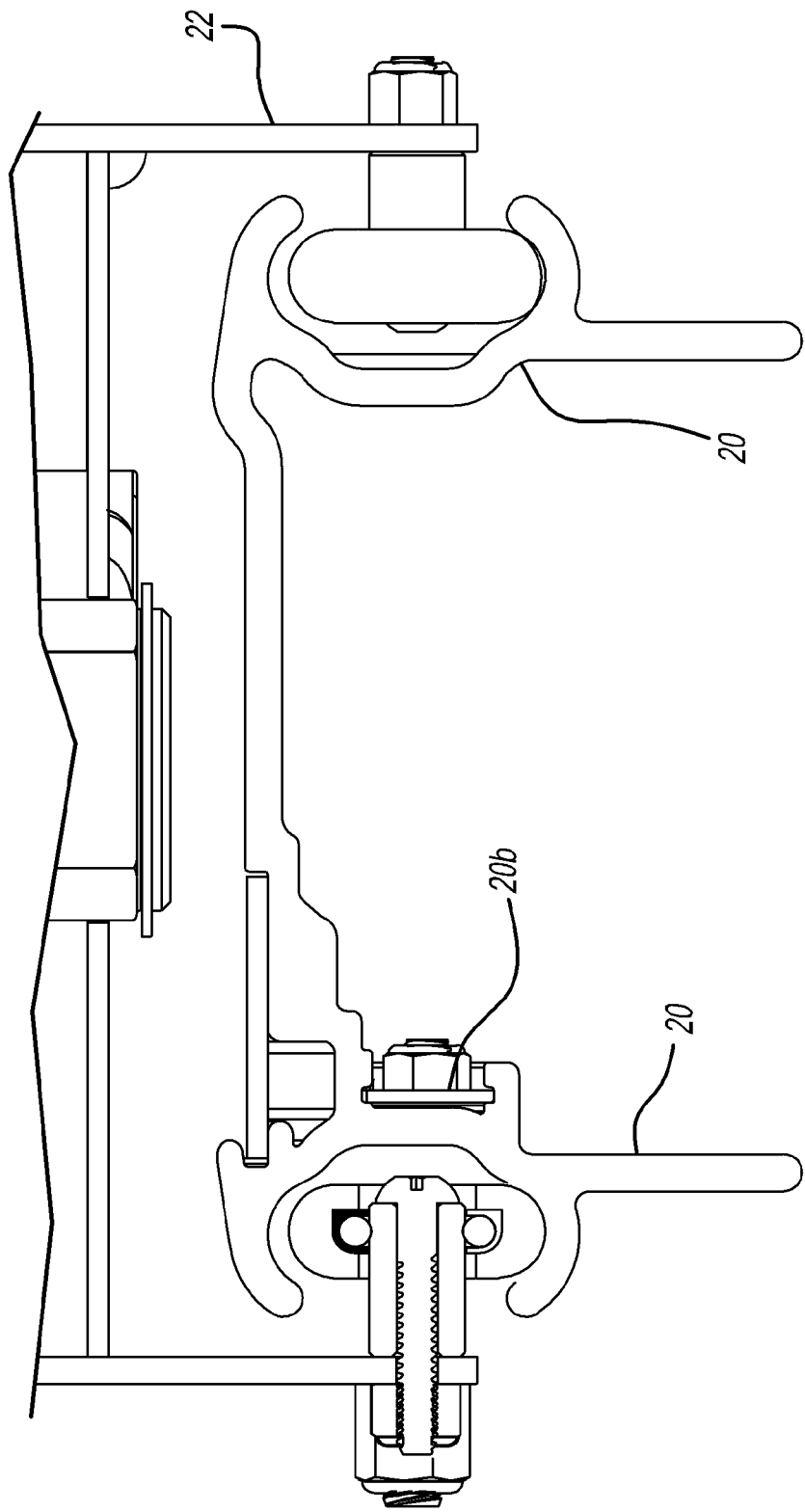
FIG. 1A is cross-sectional rear view of a guide track.

Referring now to the drawings, FIG. 1 illustrates a recumbent stepper 10 having a base 12, a pair of footbeds 14 with attached handle members 16, and a seat 18. A guide track 20 is mounted to the base 12, where the track 20 runs along a longitudinal fore-and-aft axis A. A carriage 22 is mounted to the track 20 for longitudinal travel relative thereto. The seat 18 includes a seat base 24, which is mounted to the carriage 22, and a seat back 26 mounted to the seat base 24.

The base 12 includes various mechanisms and electronics mounted within a housing 12a. These mechanisms and electronics are known in the art and will not be discussed in further detail. The housing 12a is sufficiently robust to provide support for the guide track 20 mounted thereto, and has a generally robust construction for supporting the weight of the user when the user is seated on the apparatus 10. The specifics of the construction of the housing 12a are generally known in the art and require no further discussion.

Figure 1B:
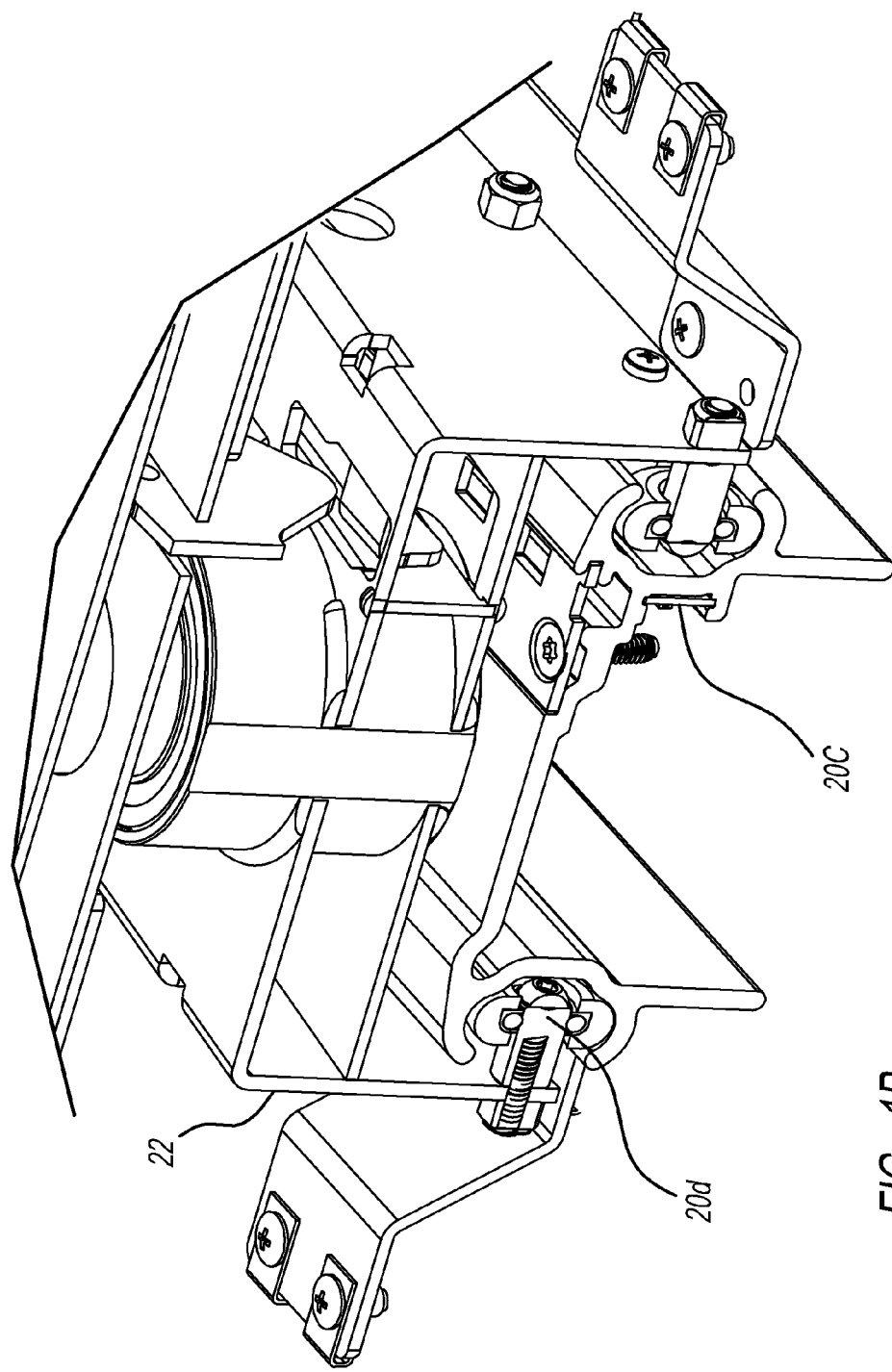
FIG. 1B is a cross-sectional isometric view of the guide track showing a carriage mounted for translation therealong.

In one form, the guide track 20 is in the form of a c-shaped guide track that defines a cavity 20a, within which wheels can roll to adjust the longitudinal position of the seat 18. With reference to FIGS. 1A and 1B, the guide track 20 can include a position sensor 20b disposed therealong for determining the location of the seat 18. More specifically, the position sensor 20b can be in the form of an elongate position sensor board 20c extending along the length of the guide track 20. The carriage 22 can include a magnet 20d mounted thereto that extends toward the guide track 20. The translation and location of the carriage 22 and seat 18 can be monitored using the sensor board 20c and magnet 20d in a manner known in the art.

Figure 2:
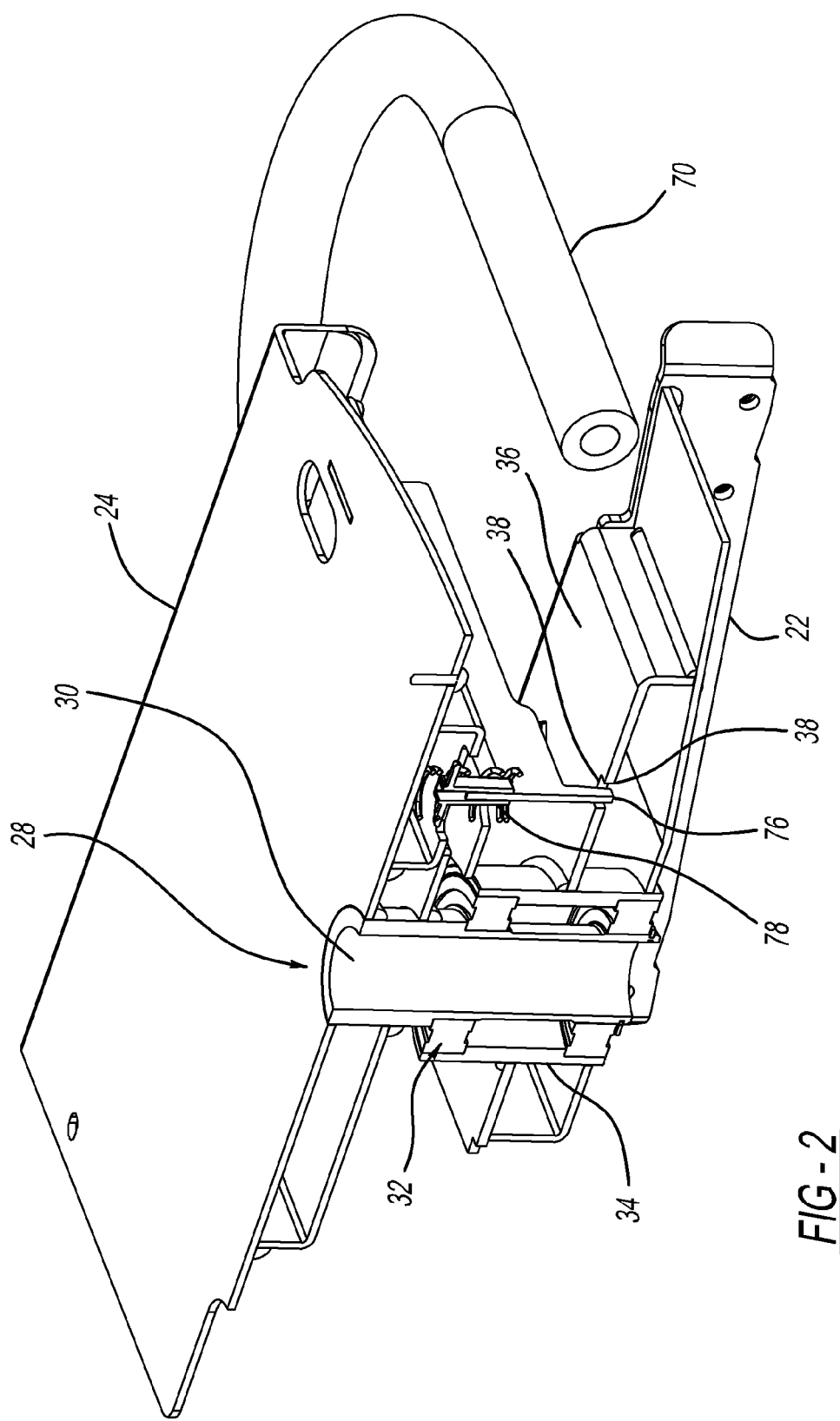
FIG. 2 a cross-sectional isometric view of a seat base and the carriage of the adjustable seating apparatus.

Turning now to FIG. 2, the seat 18 includes the seat base 24 that is mounted to the carriage 22 via a rotatable connection 28. The rotatable connection 28 can be in the form of a post 30 within a bearing 32, where the post 30 can be allowed to rotate relative to the bearing 32. The bearing 32 is received within a housing 34 that is fixedly mounted to the carriage 22.

The carriage 22 includes a positioning plate 36 thereof. The positioning plate 36 is generally flat and surrounds the housing 34 of the rotatable connection 28. The positioning plate 36 includes a plurality of openings 38 circumferentially disposed about the rotatable connection 28 for aiding in the rotary positioning of the seat 18, which will be further described below. The openings 38 can extend through the positioning plate 36, or they could be in the form of recesses, depressions, or the like.

Figure 3:
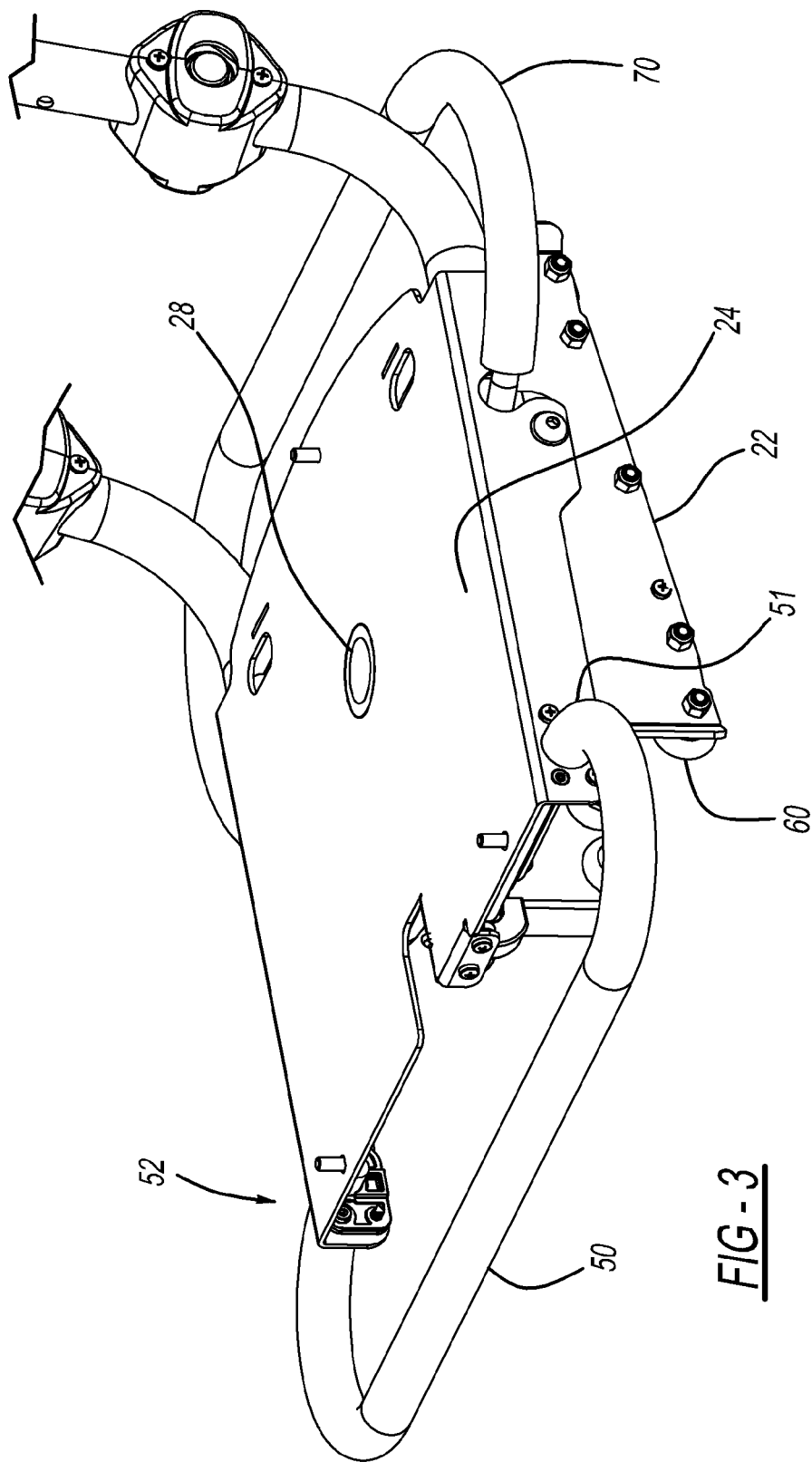
FIG. 3 is an isometric view of the seat base and the carriage, with a first and second handle mounted to the seat base.
Figure 4:
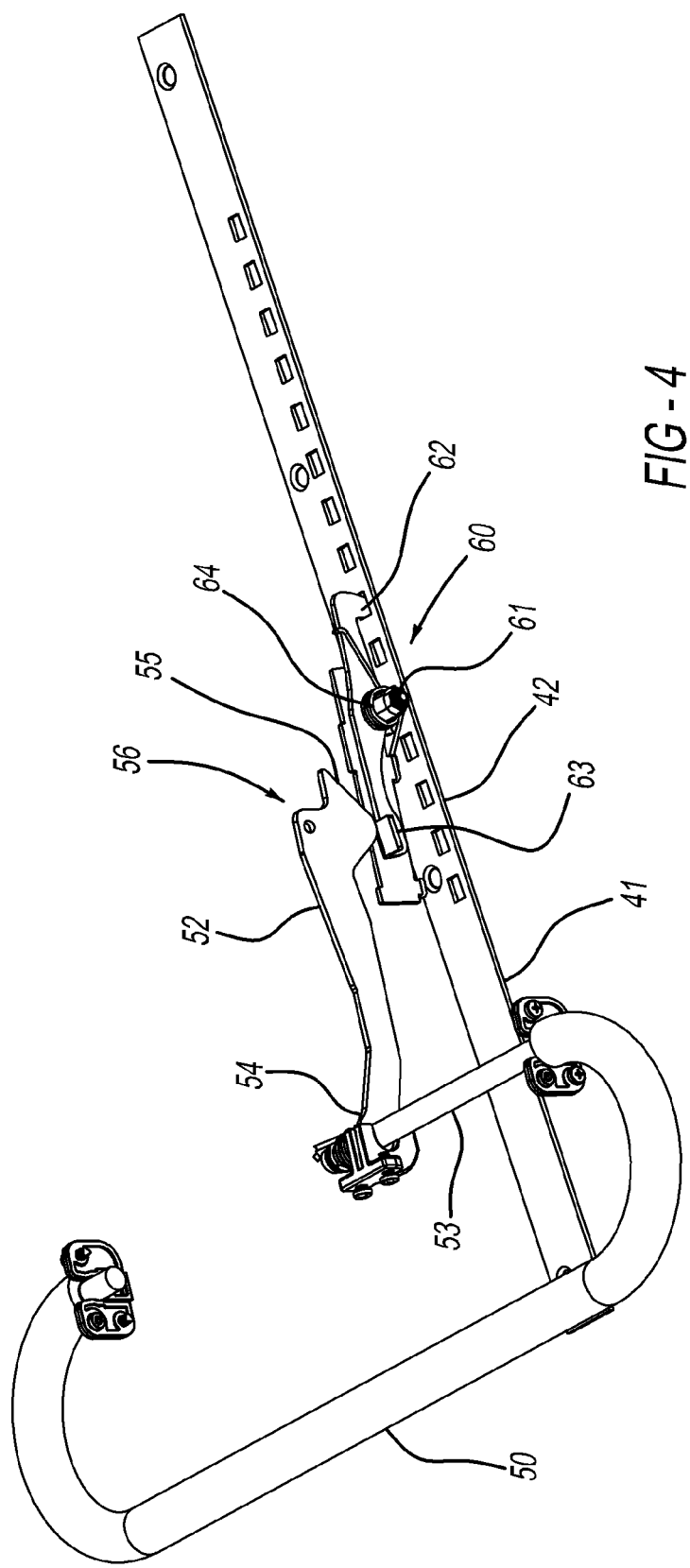
FIG. 4 is an isometric view of an elongate positioning member of the recumbent stepper and the first handle.

With reference to FIGS. 3 and 4, the carriage 22 is mounted for travel along the guide track 20 via a tracked or rolling connection 40. The base 12 can include an elongate positioning member 41 fixedly mounted thereto that is generally aligned parallel with the guide track 20 for aiding in the longitudinal positioning of the seat 18 along the track 20. The elongate positioning member 41 can include a plurality of openings 42 disposed along the length of the elongate positioning member 41 for positioning the seat 18 longitudinally, which will be further described below.

The seat 18 is thus capable of being adjusted both longitudinally and rotationally relative to the base 12. This allows the stepper 10 to accommodate a range of user heights by being longitudinally adjustable, and also allows the user to more easily sit down into the stepper or stand up from the stepper by rotating the seat between a loading/unloading position and an exercising position.

With reference again to FIG. 3, the stepper 10 further includes a first handle 50 that is mounted to the seat base 24 via a first pivotable connection 51. The handle 50 can be used to allow the seat to translate longitudinally along the guide track 20. The handle 50 can have a generally elongate form and extend laterally across the fore-and-aft axis of the stepper 10 in front and generally below the seat 18. In one form, the pivotable connection 51 can be in the form of a pair of pivotable connections 51 at opposite sides of the handle 50, allowing the handle 50 to pivot up and down relative to the seat base 24.

With reference to FIG. 4, the handle 50 can be connected to a release activator 52 that can be in the form of an arm or other elongate extension from the handle 50. The release activator 52 can be mounted to one side of the handle 50 via an extension bar 53 such that it is generally aligned above and parallel to the elongate positioning member 41. A handle end 54 of the release activator 52 can be fixedly mounted to the extension bar 53, with a hammer portion 55 at a free end 56 at the opposite end of the activator 52. A coil spring, or similar biasing mechanism, can be mounted between the handle 50 and the seat base 24 for biasing the handle 50 downward relative to the seat base 24. Alternatively, the handle 50 can have sufficient weight to allow it to pivot downward due its weight. Thus, pulling up on the handle 50 will cause the hammer portion 55 of the release activator 52 to move downward, and upon releasing the handle 50, the spring bias or handle weight will cause the handle 50 to pivot back downward, causing the release activator 52 and hammer portion 55 to return upward.

A locking lever 60 can be pivotally mounted to a side of the carriage 22 via a pivotal connection 61. The locking lever 60 is positioned generally between the release activator 52 and the elongate positioning member 41 and extends generally parallel to the elongate positioning member 41. The locking lever 60 can include a locking tab 62 at one end and an activator surface 63 at the opposite end, where the activator surface 63 is generally positioned below the hammer 55 of the release activator 52. The locking lever 60 can include a spring 64 at the pivotal connection 61 that biases the locking tab 62 downward and the activator surface 63 upward. With reference to the above, pulling on the handle 50 will cause the release activator 52 to move downward, contacting the activator surface 63 of the locking lever 60 and forcing the locking tab 62 upward. Upon releasing the handle 50, the release activator 52 will return upward, and the spring bias in the locking lever 60 will cause the activator surface 63 to move upward and the locking tab 62 to return downward.

The elongate positioning member 41 can be mounted to the base 12 via a mechanical connection, such as a screw, bolt, or the like. The elongate positioning member 41 includes a plurality of the openings 42 therein for aiding in the longitudinal location of the seat 18. The openings 42 can extend through the elongate positioning member 41, or they can in the form of recesses, depressions, or the like. The openings 42 can be equally spaced along the elongate positioning member 41, or they can be spaced at different distances from each other. The locations of the openings 42 will correspond to the various possible longitudinal positions for the seat 18.

The locking tab 62 of the locking lever 60, being biased downward toward the guide track 20, can be received in one of the plurality of openings 42, thereby generally locking the position of the carriage 22 and the seat 18 mounted thereto.

Figure 5:
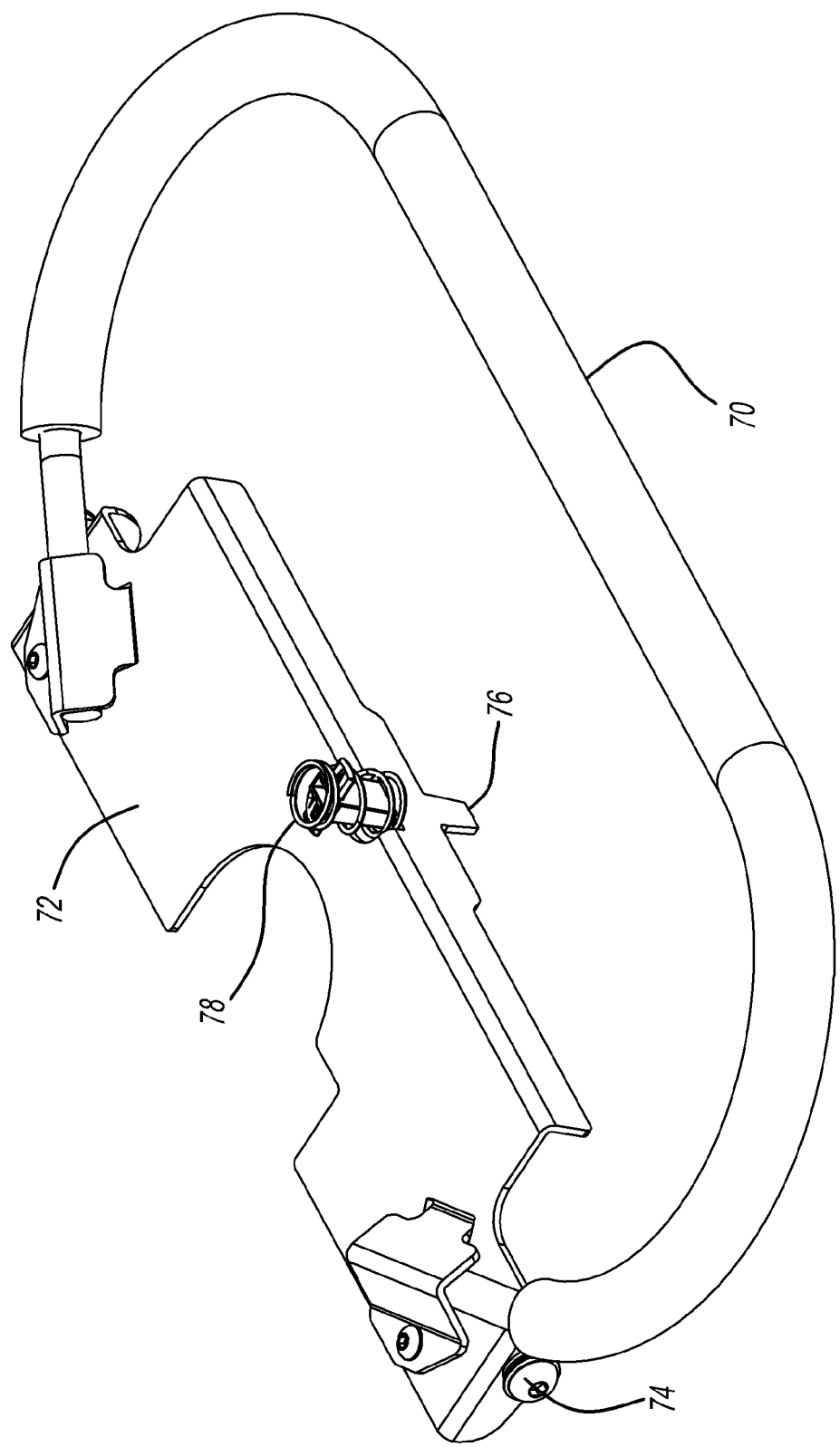
FIG. 5 is an isometric view of the second handle and a plate member mounted between opposite ends thereof.

Turning now to FIGS. 2, 3, and 5, the seat 18 can further include a second handle 70 for causing rotation of the seat 18 relative to the carriage 22. As described above, the seat base 24 is rotatably mounted to the carriage 22. The positioning plate 36 includes the openings 38 therein, as previously described. The second handle 70 is mounted at opposite ends to a plate member 72, which extends between the opposite ends. With reference to FIG. 5A, the plate member 72 is mounted to the seat base 24 via a master pivotable connection 74 and a corresponding slave pivotable connection 75 on the opposite side of the plate member 72. The slave pivotable connection is in the form of a pin 75a that can slide laterally to account for tolerance buildup. The second handle 70 extends laterally across and behind the seat 18. A second locking tab 76 extends downwardly from the plate member 72 toward the positioning plate 36. The locking tab 76 is disposed at a location within the perimeter of the handle 70. A coil spring 78 or other biasing member can be disposed between the plate member and the seat base 24, which biases the plate downwardly away from the bottom of the seat base 24.

The locking tab 76 can be received within one of the openings 38 in the positioning plate 36, with the spring 78 biasing the locking tab 76 into the opening 38. Pulling up on the second handle 70 will cause the plate member 72 to pivot relative to the pivotable connection 74, and the locking tab 76, being within the perimeter of the handle 70, will be pulled upward as well. Upon releasing the handle 70, the plate 72 and locking tab 76 will be biased downward back toward the positioning plate 36 and the openings 38 therein.

The above structure allows for the seat 18 to be adjustable both longitudinally and rotationally relative to the stepper base 12. The rotational adjustment allows for the seat 18 to be rotated to a position where a user can sit down into the seat from one side of the machine 10 and then rotate to a position facing forward to conduct an exercise routine. Upon finishing the routine, the user can rotate the seat 18 again in order to position herself to stand up from the machine on one side. This rotational adjustment can permit the user to generally avoid having to stand up and then step over the machine base 12. As will be described in further detail below, when the seat 18 is in a rotated position, the bias of the locking tab 62 will cause the locking tab 62 to engage one of the openings 42 to limit longitudinal translation.

Figure 6:
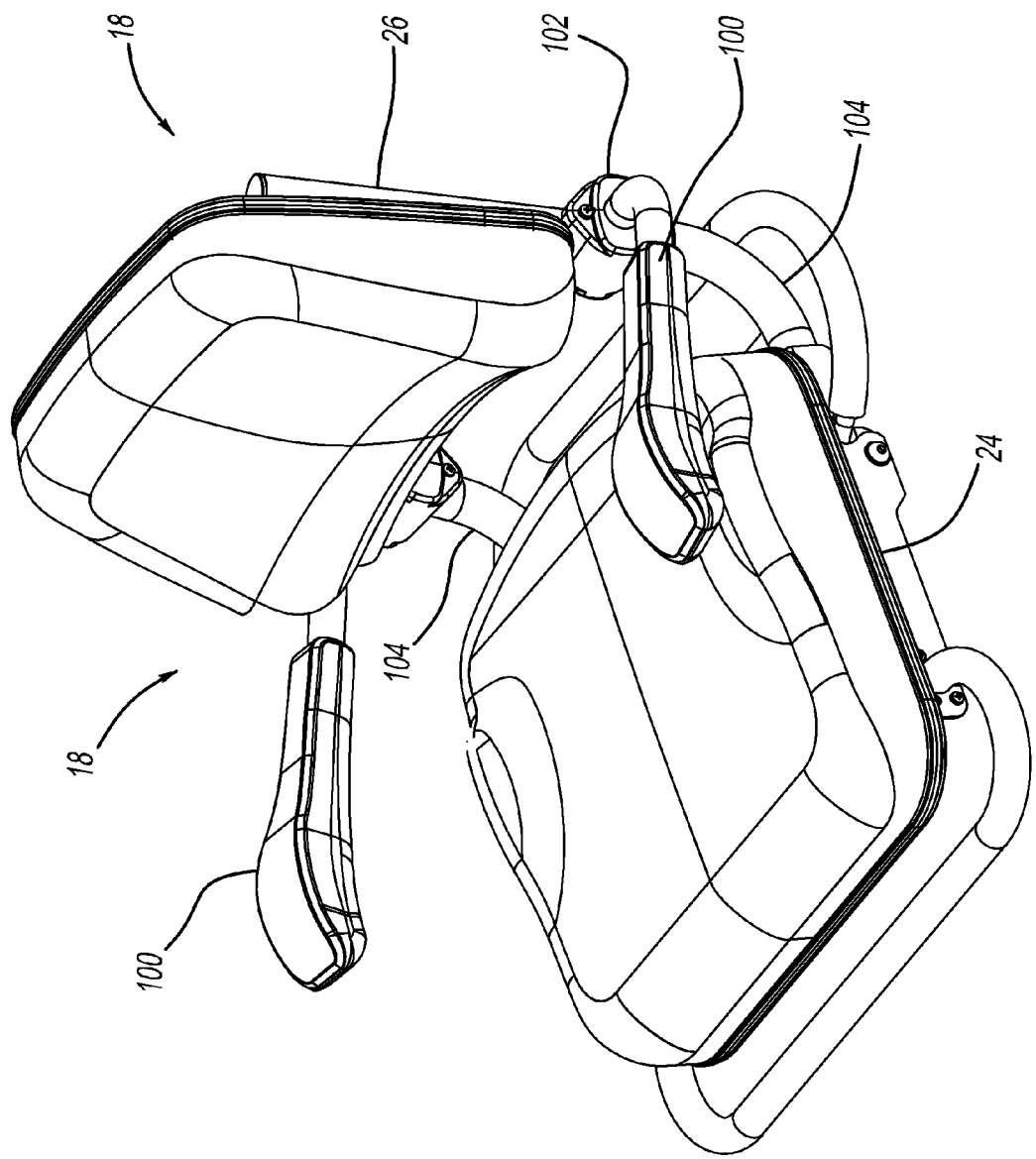
FIG. 6 is an isometric view of the adjustable seating apparatus.
Figure 7:
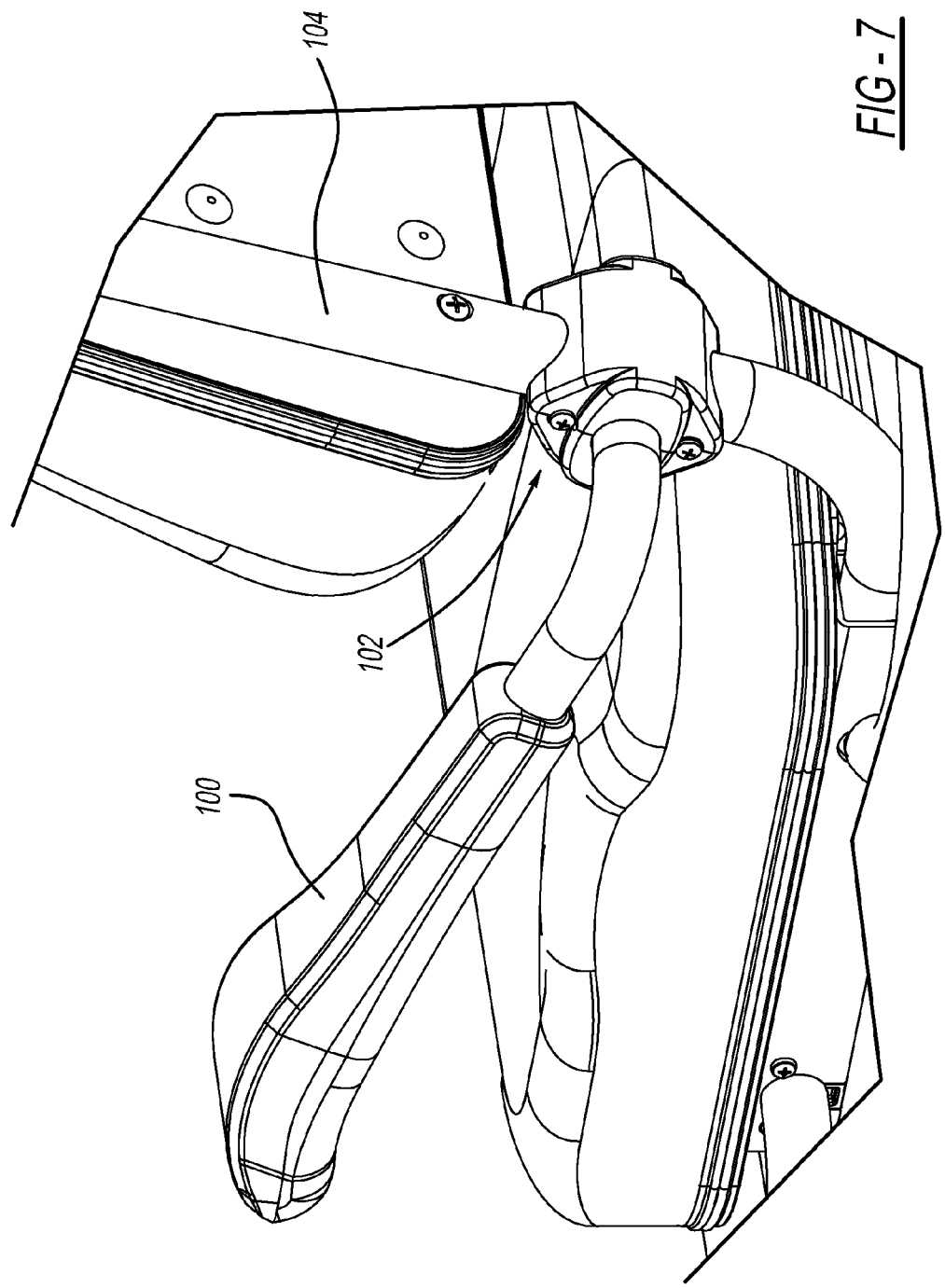
FIG. 7 is an isometric view of an armrest mounted to the seating apparatus.
Figure 8:
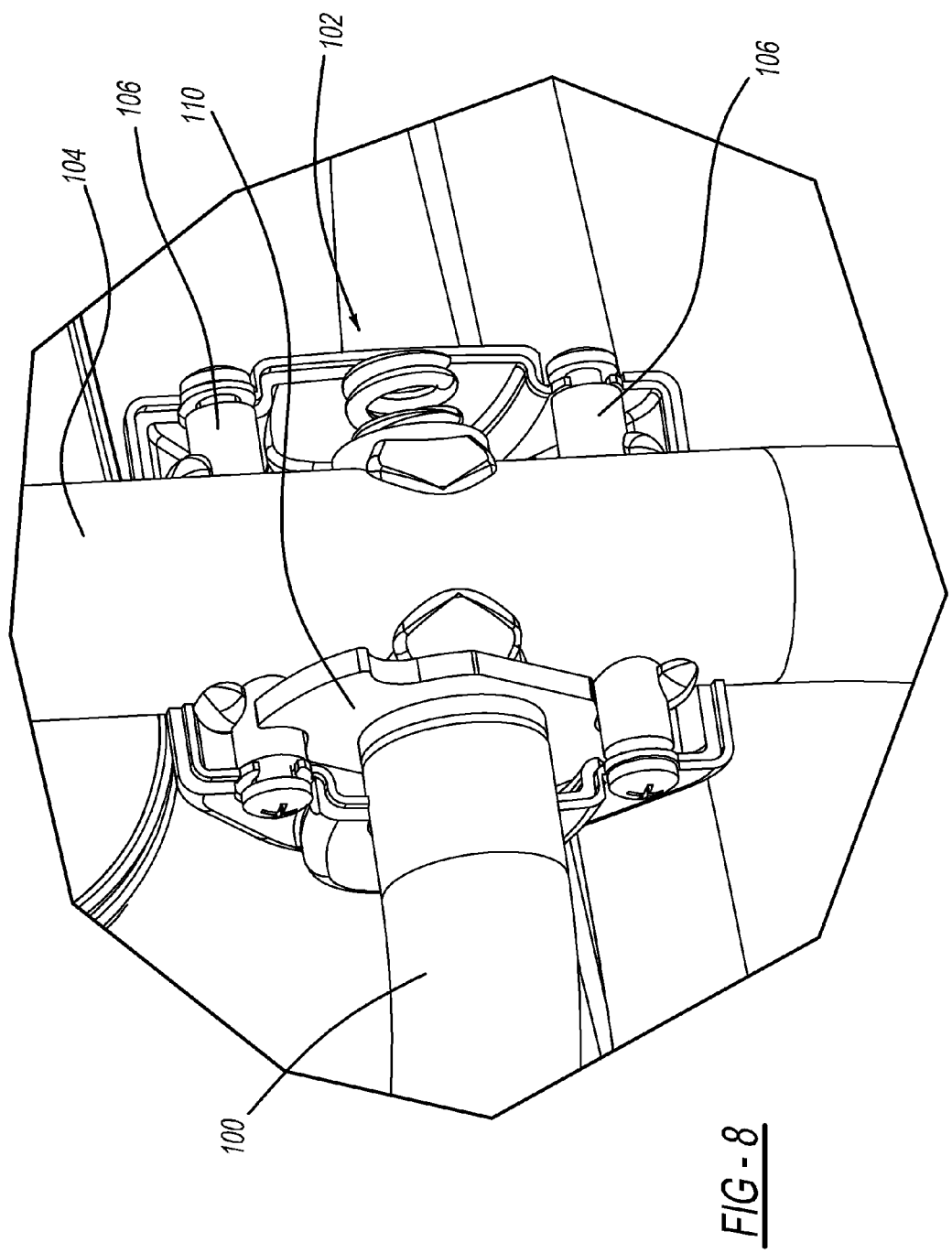
FIG. 8 is a partial cross-sectional view of a rotatable connection between the armrest and the seating apparatus.

Turning now to FIGS. 6 and 7, the seat 18 can further include an armrest 100 mounted thereto for supporting a user's arms while the user is seated. Each armrest 100 can be mounted to seat 18 via a rotatable connection 102. More specifically, each armrest 100 can be rotatably mounted in a manner that allows the user to easily adjust the rotational position of the armrest 100 depending on the user's needs. For example, the armrest 100 can be lowered to provide support for the arms, or it can be raised to allow for greater arm mobility or to be moved out of the way while sitting down or standing up from the seat. Each armrest 100 can be independently adjustable relative to the other armrest, so a user can choose whether to raise or lower both armrests 100 or a single armrest 100.

With reference to FIGS. 8-11, the seat back 26 can be mounted to a support bar 104 that extends between the seat base 24 and the seat back 26. The rotatable connection 102 can be mounted to the support bar 104 at each side of the seat 18. The support bar 104 can include a set of posts 106 extending laterally therethrough. In one form, one of the posts 106 can be designated as an upper post, and the other post 106 can be designated as a lower post, where each post 106 includes inner and outer portions, so that the set of posts 106 can include an inner upper post 106a, an inner lower post 106b, an outer upper post 106c, and an outer lower post 106d.

Figure 9:
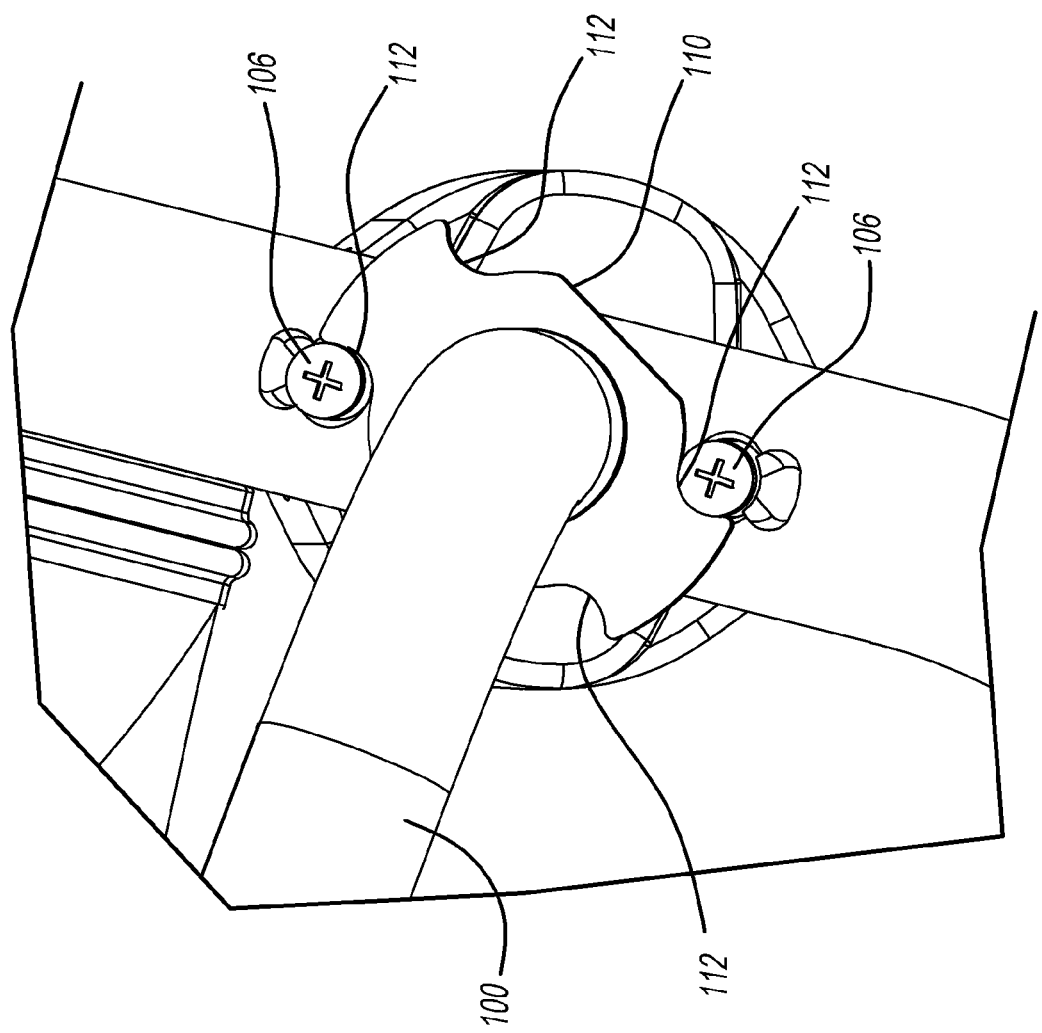
FIG. 9 is a side view of the armrest mounted to the seating apparatus and a stop member for limiting the rotation of the armrest.

The armrest 100 can include a pivotable stop member 110 at its inner end. The stop member 110 has a generally planar shape and includes a plurality of concave portions 112 that are configured to abut the posts 106 to limit the rotational travel of the armrest 100. In one form, the stop member 110 includes four concave portions 112 at each corner of the stop member 110. The concave portions 112 can be symmetrical about a longitudinal axis of the stop member 110 and also about a lateral axis of the stop member. Thus, when the armrest 100 is pivoted downward, two of the concave portions 112 at opposite corners of the stop member 110 can engage the outer upper and lower posts 106c and 106d to limit the downward rotation of the armrest (FIG. 9). Similarly, when the armrest is pivoted upward, the other two concave portions at the other corner can engage the posts 106c and 106d and limit the upward pivoting.

Figure 10:
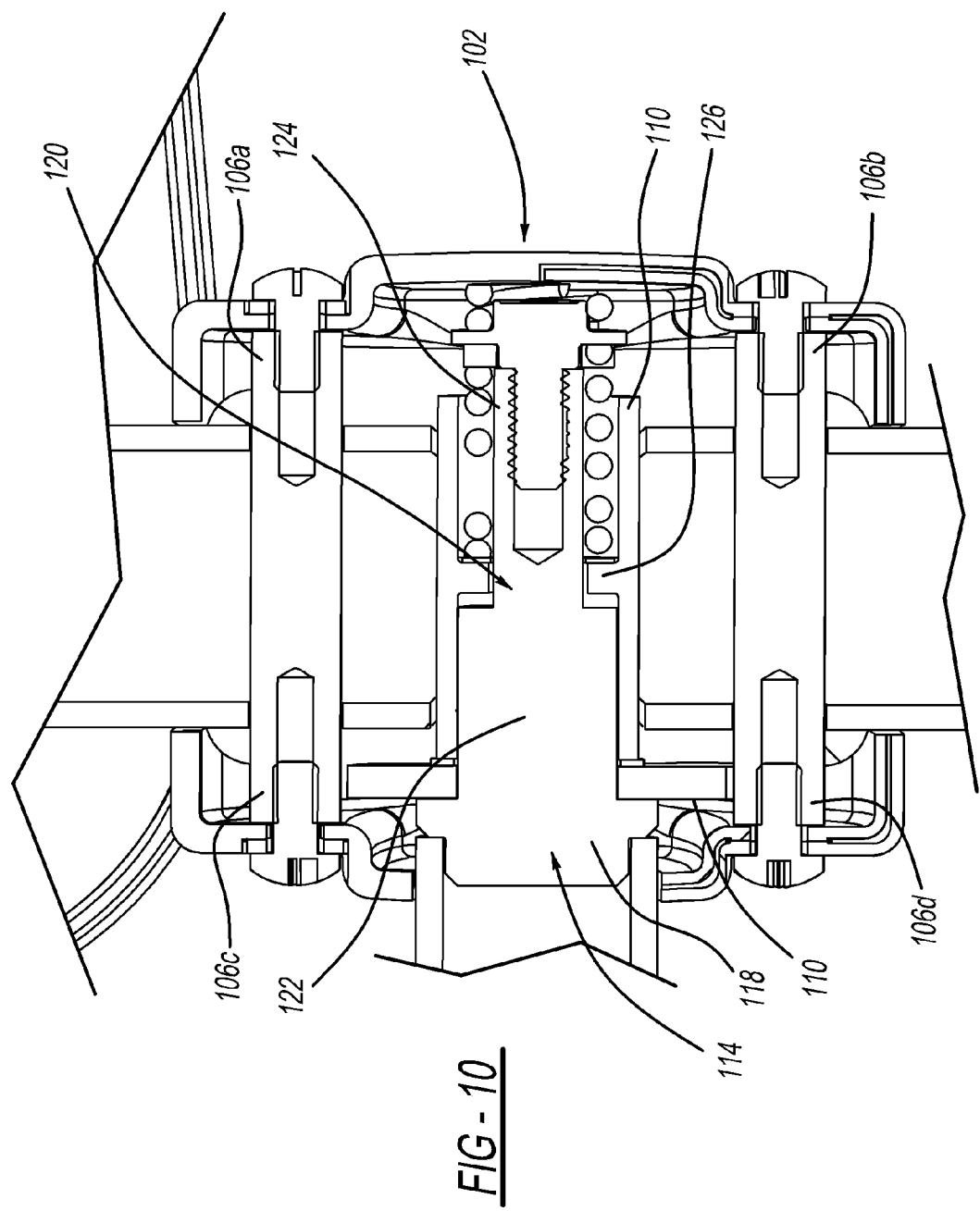
FIG. 10 is a cross-sectional view of the rotatable connection between the armrest and the seating apparatus.
Figure 11:
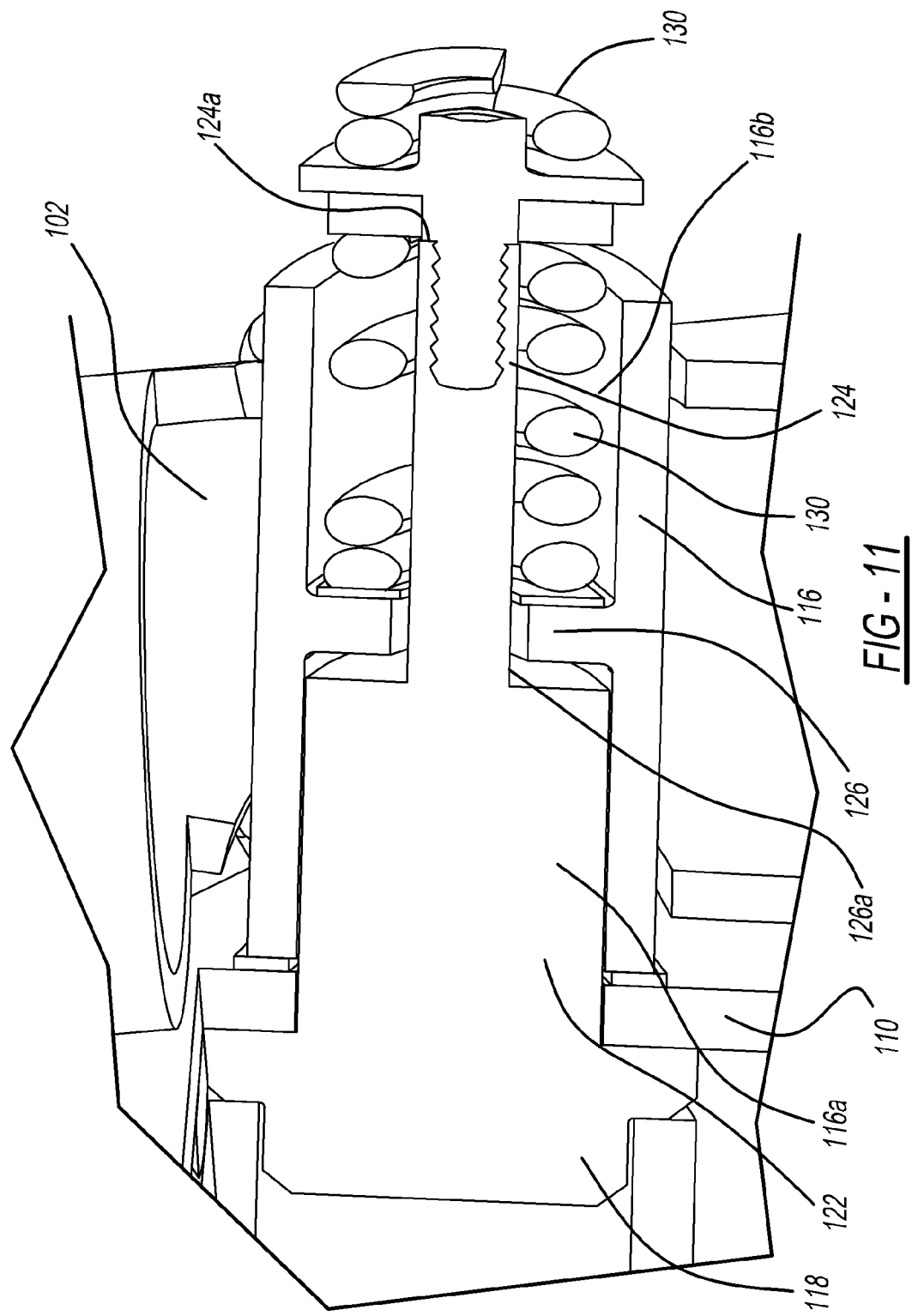
FIG. 11 is an isometric cross-sectional view of the rotatable connection between the armrest and the seating apparatus.

With reference to FIGS. 10 and 11, the arm rest 100 is held in place via a combination of tension and friction. In one form, a shaft member 114 can be received within a central bushing 116, where the shaft member 114 is configured to slide and rotate within the bushing 116. The shaft 114 includes a head portion 118 having a larger diameter than a body portion 120 of the shaft. The shaft body 120 includes an outer portion 122 and an inner portion 124. The inner portion 124 has a diameter smaller than the outer portion 122. The bushing 116 can include an inner flange portion 126 that extends laterally across the central axis of the bushing 116, which splits the bushing 116 into an outer chamber 116a and inner chamber 116b. The inner flange portion 126 includes a hole 126a connecting the outer and inner chambers 116a and 116b, though which the inner portion of the shaft can pass. The shaft outer portion 122 is sized to be received within the outer chamber 116a. The shaft inner portion 124 is sized so that a coil spring 130 can extend around the inner portion 124 and within the inner chamber 116b. An inner end 130a of the spring 130 is mounted to an inner end 124a of the shaft inner portion 124. The spring 130 extends between the inner end 124a and the flange portion 126, and is sized to bias the shaft 114 inwardly. The shaft outer portion 122 extends through the stop member 110, with the stop member 110 thereby being sandwiched between the head portion 118 and the bushing 116.

The bias in the spring 130 will cause the armrest 100 to be pulled inward toward the bushing 116, creating frictional contact therebetween. The frictional contact between the stop member 110 and the bushing 116 can allow the armrest 100 to maintain whatever position it is in. To move the armrest 110, the user can merely grab the armrest 110 and rotate it about the rotatable connection 102. The torsional force caused by pulling on the armrest 110 is generally sufficient to overcome the inward force caused by the tension in the spring 130. When the user releases the armrest 100, the armrest 100 will remain in place due to the inward force creating friction between the plate 110 and the bushing 116. Thus, the armrest 100 can be pivoted to a raised position, and the armrest 100 will tend to stay in place and not pivot back downward. This arrangement provides a robust and efficient method for adjusting the armrest 100 without requiring the use of manually positioned locks or latches.

Having described the structure of the recumbent stepper 10 above, its use will now be described in further detail.

The recumbent stepper 10 can have myriad positions due to the longitudinal and rotational adjustability described above. For example, the stepper 10 can have a first position where the carriage 22 is positioned intermediate the front and the rear of the stepper 10 along the guide track 20 and elongate positioning member 41. In this first position, the seat 18 can be oriented such that the seat back 26 faces forward in a typical manner. While in the first position, the locking tab 62 of the locking lever 60 is received in one of the openings 42 of the elongate positioning member 41, thereby maintaining the longitudinal position of the carriage 22 and the seat 18. Similarly, the locking tab 76 mounted to the second handle 70 is received in one of the openings 38 in the positioning plate 36 to maintain the orientation of the seat 18. Thus, the seat can have a first longitudinal locked position and a first rotary locked position.

To translate the carriage 22 and seat 18 longitudinally from the first position to a second position, the user can lift up on the first handle 50. Lifting the handle 50 causes the release activator 52 to pivot downwardly, where it will contact activator surface 63 of the locking lever 60, forcing it downward. The locking tab 62 at the opposite end of the locking lever 60 will thus move upward, causing the locking tab 62 to be released from the opening 42 in the elongate positioning member 41. While the handle 50 is pulled upward and the locking tab 62 and positioning member 41 are disengaged, the carriage 22 is free to translate along the guide track 20 either forward or rearward relative to the first position. For purposes of discussion and not limiting, the second position will be a position rearward of the first position, but it will be appreciated that the second position could also be forward of the first position. Thus, in addition to the first longitudinal locked position, the seat 18 can have a second longitudinal locked position, as well as an intermediate longitudinal position therebetween.

The carriage 22 will translate along the guide track 20 to the second position. Once the carriage 22 has reached the desired second position, the user can release the handle 50, where the spring bias on the handle 50 (or its weight) will cause it to be pivot downwardly, and the release activator 52 will thus be moved upwardly. The upward movement of the release activator 52 will cause it to disengage from the activator surface 63 of the locking lever 60. The spring bias on the locking lever 60 will cause the activator surface 63 to return in an upward direction, and the locking tab 62 to return downward toward the elongate positioning member 41.

Depending on the particular location of the carriage 22, the locking tab 62 can be received directly into one of the openings 42 of the elongate positioning member 41. However, the locking tab 62 could also contact an upper surface of the elongate positioning member 41 between two adjacent openings 42. If the locking tab 62 is not received in one of the openings and instead contacts the upper surface, the carriage 22 can generally translate a relatively small amount before the locking tab 62 becomes received within one of the adjacent openings 42. The locking tab 62 will slide along the upper surface of the elongate positioning member 41, with the spring bias in the locking lever 60 continuing to force the locking tab 62 toward the positioning member 41. Upon the relatively small amount of the translation, the locking tab 62 will become aligned with one of the adjacent openings 42, and the downward force of the locking tab 62 will cause it to enter the opening 42, thereby stopping the translation and generally maintaining the longitudinal position.

To return from the second position to the first position, or another position along the elongate positioning member 41, the user can repeat the process described above and position the carriage 22 and seat 18 as desired in the new position.

Similarly, the user can adjust the rotational position of the seat 18 relative to the carriage 22 to position the seat 18 between the first position, where the seat back 26 faces forward in a typical fashion, to a second rotated position where the seat back 26 faces to the side. Thus, the seat 18 can have a first rotary locked position, an intermediate rotary position, and a second rotary locked position.

To rotate the seat 18 relative to the carriage 22, the user can lift up on the second handle 70, which is fixedly mounted to the plate member 72 having the locking tab 76. The locking tab 76 will be lifted out of the opening on the positioning plate 36, so that the seat 18 is free to rotate about its rotatable connection 28 with the carriage 22 and positioning plate 36. The seat 18 can then be rotated to a different rotational position. The user can then release the handle 70, and the spring bias on the plate member 72 will cause the handle 70 to return downward, causing the locking tab 76 to move downward. Similar to the above, if the locking tab 76 is located above one of the openings 38 in the positioning plate 36, the locking tab 76 will be received therein and thus maintain the rotational position of the seat 18. However, if the locking tab 76 is positioned rotationally between adjacent openings 38 on the positioning plate 36, then the locking tab 76 will contact the positioning plate 36, and the seat 18 will remain rotatable, while the force of the spring bias continues to force the locking tab 76 against the positioning plate 36. The seat 18 can be further rotated from this condition, where the locking tab 76 can slide across the positioning plate 36 until the seat 18 has rotated sufficiently such that the locking tab 76 becomes aligned with one of the openings 38. Upon alignment with one of the openings 38, the locking tab 76 will be received therein and maintain the rotational position of the seat 18.

When the seat 18 is rotated away from the first position, the seat base 24 and the handles 50 and 70 mounted thereto rotate with it. It thereby follows that the components mounted to the handles 50 and 70 also become rotated from their nominal position. When the seat 18 is rotated, the release activator 52 mounted to the first handle 50 rotates along with the first handle 50. This rotation of the release activator 52 causes the hammer 55 of the release activator 52 that was aligned with the activator surface 63 of the locking lever 60 to be moved away from the activator surface 63 of the locking lever 60. The locking lever 60 does not rotate because the locking lever 60 is mounted to the carriage 22. With the release activator 52 rotated away from the locking lever 60, actuation of the first handle 50 will not cause the locking lever 60 to be contacted by the release activator 52. Thus, the carriage 22 and seat 18 are limited from longitudinal translation when the seat 18 is in a rotated position. In a similar manner, if the carriage 22 is currently translating from the first position to the second position, and the second handle 70 is actuated during the translation causing a rotation of the seat 18, the release activator 52 will rotate off of the activator surface 63 of the locking lever 60. The locking lever 60 will then pivot to force the locking tab 62 thereof downward into engagement with the elongate positioning member 41, stopping the translation.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. An adjustable seating apparatus comprising:
   a guide track having a longitudinal fore-and-aft centerline;
   an elongate positioning member mounted to the guide trak generally parallel to the fore-and-aft centerline;
   a carriage member mounted to the guide track via a tracked connection for longitudinal adjustment relative to the guide track;
   a seat base mounted to the carriage member via a rotatable connection for rotary adjustment of the seat base relative to the carriage member;
   wherein the seat base has at least a first longitudinal locked position, a longitudinal intermediate position, a second longitudinal locked position, a first rotary locked position, a rotary intermediate position, and a second rotary locked position;
   a first handle mounted to the seat base via a first pivotable connection;
   a release activator mounted to the first handle portion;
   a locking lever pivotally mounted to the carriage via a pivotable connection, the locking lever having a first locking tab at an end thereof;
   a plurality of recesses in the positioning member aligned longitudinally therealong;
   wherein the first handle and release activator are biased toward a non-activated position;
   wherein the locking lever is biased toward a first locked position with the locking tab portion received in one of the plurality of recesses in the positioning member when the seat base is in the first longitudinal locked position or the second longitudinal locked position;
   a second handle mounted to the seat base via a second pivotable connection;
   a second locking tab fixedly mounted to the second handle;
   a positioning plate mounted to the carriage member;
   a plurality of recesses aligned circumferentially about the positioning plate; and
   wherein the second handle and the second locking tab are biased toward a second non-activated position with the second locking tab received in one of the plurality of recesses when the seat base is in the first rotary locked position or the second rotary locked position.

2. The apparatus of claim 1 wherein the locking lever includes an activator surface at one end and the first locking tab at another end, with the locking lever pivotable connection therebetween.

3. The apparatus of claim 2 wherein the release activator engages and depresses the activator surface of the locking lever so that the first locking tab is disengaged from the elongate positioning member recesses when the first handle and release activator are in an activated position and the seat base is in the first rotary locked position, thereby allowing for longitudinal translation of the seat base from the first or second longitudinal locked position.

4. The apparatus of claim 3 wherein the locking tab portion of the locking lever engages the positioning member when the release activator is disengaged from the locking lever.

5. The apparatus of claim 1 wherein the second locking tab is received within the positioning plate recess when the second handle is in a non-activated position for preventing rotation of the seat member, and the locking tab portion is disengaged from the plate recess when the second handle is in an activated position for allowing rotation of the seat base.

6. The apparatus of claim 2 wherein the release activator is rotated away and disengaged from the activator surface of the locking lever when the seat base is in the intermediate rotary position or the second rotary locked position, and the locking lever tab potion engages one of the positioning member recesses due to the disengagement of the locking lever and release activator so that the seat base is limited from translating longitudinally when the sat base is in the intermediate rotary position or the second rotary locked position.

7. The apparatus of claim 1 wherein the release activator is fixedly mounted to the first handle at one end and a hammer portion extends downwardly from the other end.

8. The apparatus of claim 1 further comprising a plate member extending between opposite ends of the second handle, and the second locking tab extends downwardly from the plate member within a perimeter of the second handle.

9. The apparatus of claim 1 further comprising a master pivotable connection between the second handle and the seat base at one end of the second handle and a slave pivotable connection between the second handle and the seat base at the other end of the second handle, wherein the master pivotable connection is configured to allow a rotational degree of travel of the second handle and limiting lateral looseness between second handle and the seat base, and the slave pivotable connection is configured to allow for limited lateral translation between the second handle and the seat base along with a rotational degree of travel.

10. The apparatus of claim 1 further comprising:
    a seat back mounted to the seat base; and
    an arm rest rotatably mounted to the seat back via a rotatable connection.

11. The apparatus of claim 1, wherein the guide track is a c-shaped guide track defining a cavity.

12. The apparatus of claim 11, further comprising a seat position magnet disposed within the cavity and a seat position sensor extending along the guide track.

13. The apparatus of claim 1, wherein the seat base is rotatable 360 degrees relative to the carriage.

14. An adjustable seating apparatus comprising:
- a guide track having a longitudinal fore-and-aft centerline;
- an elongate positioning member mounted to the guide trak generally parallel to the fore-and-aft centerline;
- a carriage member mounted to the guide track via a tracked connection for longitudinal adjustment relative to the guide track;
- a seat base mounted to the carriage member via a rotatable connection for rotary adjustment of the seat base relative to the carriage member;
- wherein the seat base has at least a first longitudinal locked position, a longitudinal intermediate position, a second longitudinal locked position, a first rotary locked position, a rotary intermediate position, and a second rotary locked position;
- a first handle mounted to the seat base via a first pivotable connection;
- a release activator mounted to the first handle portion;
- a locking lever pivotally mounted to the carriage via a pivotable connection, the locking lever having a first locking tab at an end thereof;
- a plurality of recesses in the positioning member aligned longitudinally therealong;
- wherein the first handle and release activator are biased toward a non-activated position;
- wherein the locking lever is biased toward a first locked position with the locking tab portion received in one of the plurality of recesses in the positioning member when the seat base is in the first longitudinal locked position or the second longitudinal locked position;
- a seat back mounted to the seat base;
- an arm rest rotatably mounted to the seat back via a rotatable connection:
- a bushing mounted to the seat back, the busing having inner and outer chambers therein generally separated by flange portion therebetween;
- a shaft portion mounted to the armrest and extending at least partially through the bushing, the shaft portion having an inner portion and an outer portion, wherein the inner portion has a smaller diameter than the outer portion, and the inner portion extends through a hole in the flange portion so that the inner portion is received in the outer chamber; and
- a coil spring mounted to an inner end of the inner portion and disposed within the inner chamber and between the inner end and the flange portion so that the coil spring biases the shaft portion inwardly.

15. The apparatus of claim 14 further comprising:
- at least one post mounted to the seat back and extending generally parallel to the bushing;
- a stop member mounted to the armrest and having at least one concave surface, wherein the at least one concave surface is configured to abut the at least one post member when the armrest has been rotated to a first armrest position.

16. The apparatus of claim 15, wherein the seat back includes a support bar mounted to the seat base, and the rotatable connection is mounted to the support bar.

* * * * *